(No Model.)
H. P. BROWN.
APPARATUS FOR DETECTING ELECTROLYSIS OF UNDERGROUND PIPES AND LOCATING TRANSMISSION LOSSES.
No. 587,698. Patented Aug. 10, 1897.
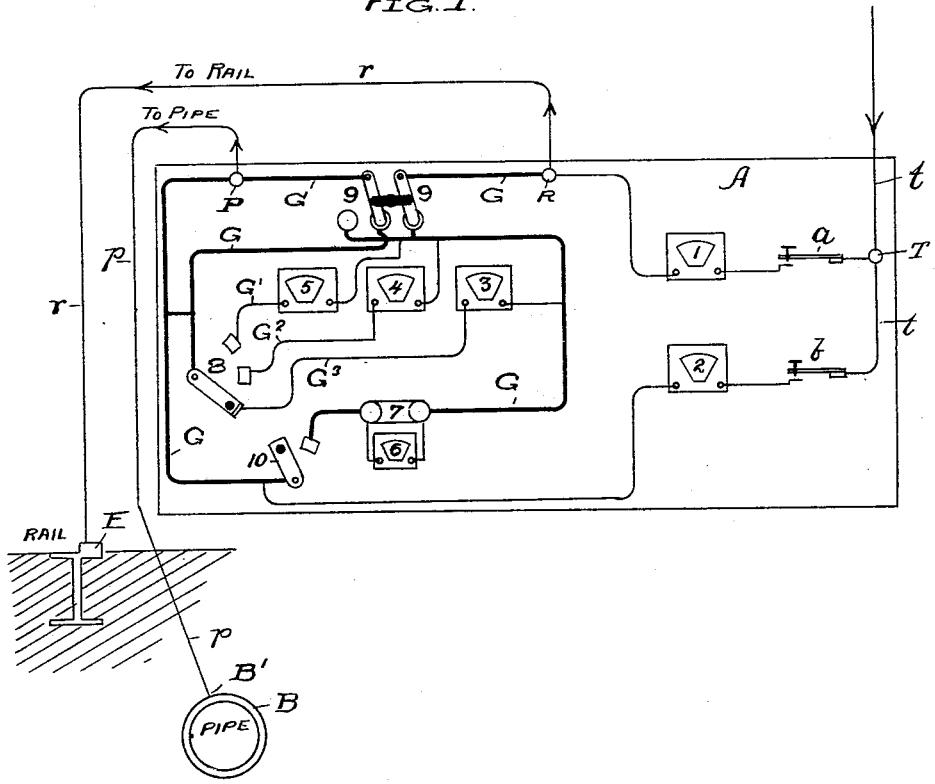
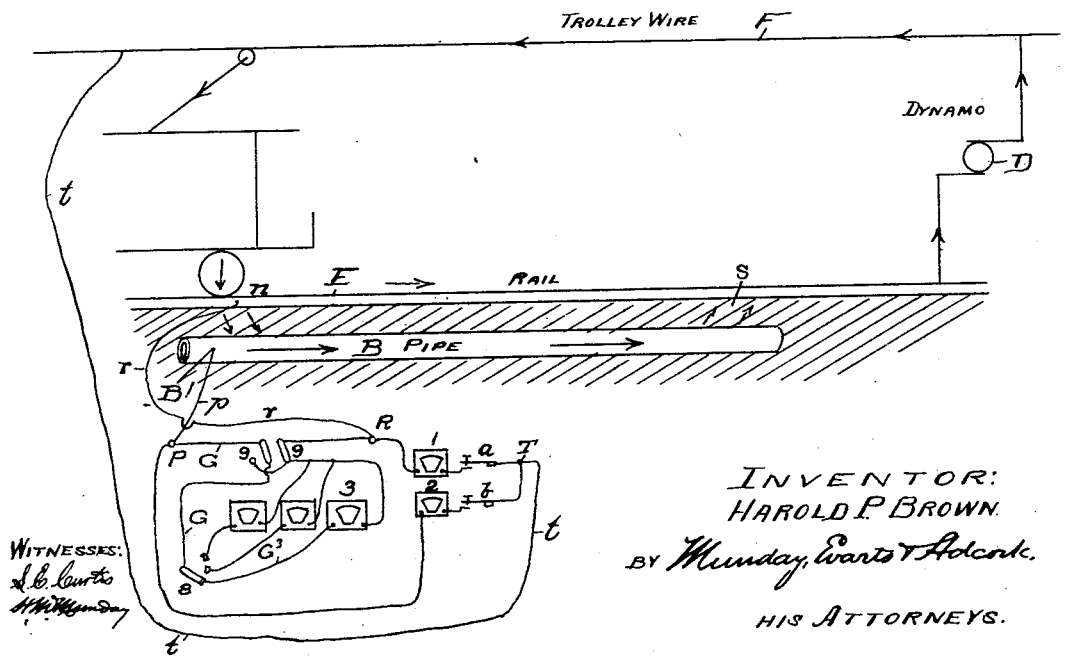
INVENTOR:
HAROLD P. BROWN.
BY Munday, Evarts & Adcock.
HIS ATTORNEYS.
WITNESSES:

UNITED STATES PATENT OFFICE.

HAROLD P. BROWN, OF NEW YORK, N. Y.

APPARATUS FOR DETECTING ELECTROLYSIS OF UNDERGROUND PIPES AND LOCATING TRANSMISSION LOSSES.

SPECIFICATION forming part of Letters Patent No. 587,698, dated August 10, 1897.

Application filed January 27, 1896. Serial No. 576,952. (No model.)

*To all whom it may concern:*

Be it known that I, HAROLD P. BROWN, a citizen of the United States, residing in New York, in the county of New York and State of New York, have invented a new and useful Improvement in Apparatus for Detecting Electrolysis of Underground Pipes and Locating Transmission Losses, of which the following is a specification.

My invention relates to apparatus for detecting electrolysis of underground pipes and of locating transmission losses in electric-railway or other systems.

Heretofore the ordinary way or method of detecting electrolysis of underground pipes has been to connect one terminal of a low-reading voltmeter to the pipe and the other terminal to a pointed iron rod driven into the ground or else to a rail of the electric road. Both these methods are very unreliable, the former because the electric potential of the earth is affected by the various pipes in the earth and by the distribution of the rails and their connections on the surface and by the varying conditions of the earth in respect to moisture or in respect to strata of rock, clay, sand, or gravel underground, any one or more of which may affect the readings of the voltmeter, as will also the distance between the point where the iron rod is driven into the earth and the pipe or the rail, and in the latter case, where the readings are taken merely between the pipe and rail, the results may be entirely misleading from any one of a number of causes—such, for example, as poor contact on the pipe, a poor joint in the pipe, a poor contact on the rail, a broken or defective joint on the rail, variations of pressure at the dynamo-terminals, variation of load upon the dynamos, poor contact of the wires leading to the voltmeter, poor contact in the voltmeter itself, or the voltmeter being out of proper adjustment, or from a combination of any two or more of these causes.

The object of my invention is to provide a simple and efficient method by means of which the electrical conditions of underground pipes may be easily and accurately ascertained with certainty, the conditions which in the old methods were sources of error being either eliminated or else checked or guarded against.

In practicing my invention I first measure with a voltmeter the difference of pressure between the trolley-wire and the rail of the surface electric road and note the result, and I then in like manner note the difference in pressure between the trolley-wire and the underground pipe to be tested, and then in like manner the difference in pressure between the rail and the pipe, and I next repeat the first two measurements, while the voltmeter employed to measure the difference of pressure between the pipe and rail remains in connection in a branch or parallel circuit. The three readings first made afford a mutual check upon each other, as the sum of the two smaller readings should equal that of the larger if the conditions are normal—that is to say, if there are no imperfect contacts on rail or pipe. By repeating the first two readings one after another while the voltmeter between the rail and pipe remains in circuit and noting the result as compared with the former readings the changed reading will indicate the existing fault—such, for example, as a poor connection at either rail or pipe, or if the rail is badly bonded or the pipe is disconnected, and when the needle of the low-reading voltmeter between the pipe and rail does not quiver when the voltmeters between the trolley-wire and rail and between the trolley-wire and the pipe are put in and out of circuit one after another the indication or reading of the voltmeter between the pipe and rail will give the exact pressure between rail and pipe, and at this time the sum of the two smaller readings should equal the greater.

In the accompanying drawings, which form a part of this specification and in which similar letters and numerals of reference indicate like parts in both figures, I have shown at Figures 1 and 2 diagram views of the electric circuits and instruments employed in practicing my invention.

In the drawings, A represents a portable switchboard upon which three or more, preferably five, voltmeters 1 2 3 4 5 and one ammeter 6 are arranged with the necessary switches and connections. The switchboard is also furnished with three binding-posts T, R, and P, the post T having a flexible insulating-wire *t* leading to the trolley-wire, the post R a similar wire $r$ leading to the rail E, and the post P a similar wire $p$ leading to the pipe B. Contact-spots on both rail E and pipe B are carefully filed clean and bright, and the wires $r$ and $p$ are then perfectly connected to them, preferably with amalgamated terminals and suitable clamps. The voltmeter I, arranged in the circuit $t\,r$ between the trolley-wire and rail, should be a high-reading instrument, to, say, seven hundred and fifty volts, and the voltmeter 2, arranged in the circuit $t\,p$ between the trolley-wire and the pipe, should likewise read to seven hundred and fifty volts. The voltmeters 3, 4, and 5 are each and all adapted to be included in a circuit $r\,p$ G between the rail E and pipe B. The circuit in which these voltmeters 3 4 5 are included is connected at posts R and P with the circuit leading from the trolley-wire to the rail and with the circuit leading from the trolley-wire to the pipe. The voltmeter 3 should read to one and five-tenths volts in thousandths, the voltmeter 4 should read to six volts in thirtieths, and the voltmeter 5 should read up to one hundred and fifty volts. Any one of these three may be placed in the circuit G by a switch 8 and can have its terminals reversed by a double-pole switch 9 in case of a reversal of polarity between the rail and pipe. Heavy wires are used to connect the binding-posts R and P and the switches 8, 9, and 10, so that shunt 7 and millivoltmeter 6 (used as an ammeter) can be put in circuit by switch 10 and thus read amperes flowing through shunt 7 between pipe and rail. A key $a$ is employed to close the circuit $t\,r$ through the voltmeter 1 between trolley-wire and rail, and a similar key $b$ is employed to close the circuit $t\,p$ between the trolley-wire and pipe through the voltmeter 2.

At each halt along every street having underground pipes and a surface electric road readings are made between the trolley-wire and rail by pressing the key $a$, between the trolley-wire and pipe by pressing the key $b$, and between the rail and pipe by putting in the voltmeters 3, 4, or 5 by closing switch 8, the keys $a$ and $b$ being both open. After noting this third reading the voltmeter 3 or 4 is left in circuit and key $a$ again closed and opened, and the key $b$ is in like manner closed and opened while the voltmeter 3 or 4 remains in circuit. If connection at either rail or pipe is poor or if the rail is badly bonded, the closing of key $a$ will increase and the closing of key $b$ decrease the former reading of the voltmeter 3 or 4, or vice versa. In other words, the low-reading voltmeter 3 or 4 is used as a galvanometer of a Wheatstone bridge to detect any faulty conditions and to verify with mathematical accuracy all these readings.

When the low-reading needle does not quiver as keys $a$ and $b$ are closed or opened, its indication gives the exact pressure between rail and pipe, and the sum of the two smaller readings should equal the greater. If the pressure between the rail and pipe runs above three volts, the shunt 7 is put into circuit by closing switch 10, and the flow of current is noted on ammeter 6 and also the fall of pressure on voltmeter 3 or 4, if any. The switchboard-circuit G, from binding-post R to binding-post P, with the connecting-wires $t$ and $p$, is of course in parallel with the moist earth which touches both pipe and rails, and it therefore receives but a small portion of the current; but this is enough to determine approximately the current flow between pipe and rail.

My method of procedure may be more fully understood by reference to Fig. 2 of the drawings. Assuming that the rail-contact at $n$ is on an unbonded and rusty rail, when key $a$ is depressed and switch 8 is closed the current leaves the dynamo D, passes along trolley-wire F, through connecting-wire $t$ to binding-post T. It then passes through voltmeter 1 to binding-post R. As wire $r$ to rail B is pratically open, owing to its connection to an unbonded or rusty rail, as assumed, all of the current flows from R to P, through voltmeter 3 and the switchboard-circuit G, and thence through wire $p$ to the pipe B at B' and along the pipe through the earth at $s$. If the pipe-contact B' is open when key $b$ is closed, the current through voltmeter 2 reaches the post P, and as wire $p$ is open all of the current flows from post P to R through voltmeter 3 in the reverse direction. Assuming that the rail-contact is poor at $n$ in Fig. 2 at a point distant from dynamo, if key $a$ is closed the current flowing through voltmeter 1 would have high pressure behind it, and the percentage of drop in the reading due to such poor contact would be small. We will assume that the reading is five hundred and ten volts. Closing key $b$, we will assume that the reading on voltmeter 2 is five hundred and twenty volts. The reading on voltmeter 3 should show that the pipe is ten volts positive to the rail; but closing switch 8 we get a reading of but four volts, since the poor contact assumed at $n$ has but ten volts pressure to overcome the resistance in the circuit between $n$ and B', and the drop in pressure is correspondingly large. Leaving switch 8 closed, we again depress key $a$. The current, after passing through voltmeter 1 to R, has two paths presented to it, one through wire $r$ to the rail and back to the dynamo and the other through voltmeter 3, wire $p$, and the pipe back to the dynamo. The portion of the current flowing through voltmeter will be in the same direction as the current flow due the ten volts difference of pressure between the rail at $n$ and the pipe at B' The reading of voltmeter 3 will therefore be increased, say, to eight volts. On opening the key $a$ the reading is again four volts. Closing the key $b$ would have the tendency to make P and R of the same potential, since the resistance of voltmeters 1 and 2 is the same. This would reduce the reading on voltmeter 3. When the defective condition at *n* is eliminated, voltmeter 3 will read ten volts and its needle will not quiver as keys *a* and *b* are opened and closed. The sum of the readings of Nos. 1 and 3 will then equal the reading of No. 2. These readings show at once that the return-path by the rails is of greater resistance than it should be, since the drop on the rails is ten volts greater than the drop on the return-circuit, which leads from the rails at *n* through the earth to the pipes, along the pipes, and then back through the earth at *s* to the rails. Therefore the rails between *s* and *n* need rebonding. It is of course assumed that the trolley and its feeders, whose sizes and carrying capacity and current load are known, are of sufficient size to secure proper results.

If by comparison with power-house records it is found that at the time these readings were made the pressure was five hundred and thirty volts at dynamo-terminals when it should be five hundred and fifty, it is evident that the dynamos are overloaded and should be reinforced; or it may be found after making similar readings all along the line of the electric road and marking results on a map that the total losses in the rail returns are so great that forty or fifty per cent. of the power is lost in transmission. In that case by bonding the rails, so as to make them electrically continuous, these losses are eliminated and the useful capacity of the dynamos and engines practically doubled. By this method and this use of the pipes as a return-conductor in making measurements to determine the extent and location of transmission losses on the rail returns accurate results may be obtained.

The same measurements will indicate the extent, location, and amount of electrolytic corrosion of the pipes.

I claim—

1. The apparatus for detecting electrolysis in underground pipes and of locating electrical transmission losses, consisting in the combination with the trolley-wire, the rail and the underground pipe of a portable switchboard furnished with three or more voltmeters and switches and connections whereby one of said voltmeters may be put in circuit between the trolley-wire and the rail, a second between the trolley-wire and the underground pipe and a third between the rail and pipe, the third voltmeter being arranged so that it can be kept in circuit while either or both the other voltmeters are in circuit, substantially as specified.

2. The apparatus for detecting electrolysis in underground pipes and of locating electrical transmission losses, consisting in the combination with the trolley-wire, the rail and the underground pipe of a portable switchboard furnished with three or more voltmeters and an ammeter, and keys, switches and connections whereby one of said voltmeters may be put in circuit between the trolley-wire and the rail, a second between the trolley-wire and the pipe and a third between the rail and pipe, the third voltmeter being arranged so that it can be kept in circuit while either one or both of the other voltmeters are in circuit, said switchboard being also provided with a shunt to the third voltmeter in which said ammeter is included, substantially as specified.

3. The apparatus for detecting electrolysis in underground pipes and of locating electrical transmission losses, consisting in the combination with the trolley-wire, the rail and the underground pipe of two high-reading voltmeters, each having one terminal connected to the trolley-wire, with their other terminals connected respectively to the rail and to the pipe, and a low-reading voltmeter connected across the latter terminals, substantially as specified.

4. The apparatus for detecting electrolysis in underground pipes and of locating electrical transmission losses, consisting in the combination with the trolley-wire, the rail and the underground pipe of two high-reading voltmeters, each having one terminal connected to the trolley or outgoing wire, with their other terminals connected respectively to the rail and to the pipe, and a low-reading voltmeter connected across the latter terminals, each voltmeter being provided with a key for opening and closing its circuit, substantially as specified.

5. The apparatus for detecting electrolysis in underground pipes and of locating electrical transmission losses, consisting in the combination with the trolley-wire, the rail and the underground pipe of two high-reading voltmeters as the *a* and *b* sides of a Wheatstone bridge, a low-reading voltmeter as the galvanometer and rail and pipe conductors or their equivalents as the third and fourth sides of said bridge, substantially as specified.

HAROLD P. BROWN.

Witnesses:
A. B. TRIGGE,
C. R. WATERBURY.